United States Patent
Hessling

(10) Patent No.: US 9,132,923 B2
(45) Date of Patent: Sep. 15, 2015

(54) AIRCRAFT LIGHT

(75) Inventor: Andre Hessling, Koblenz (DE)

(73) Assignee: GOODRICH LIGHTING SYSTEMS GMBH (DE)

( * ) Notice: Subject to any disclaimer, the term of this patent is extended or adjusted under 35 U.S.C. 154(b) by 301 days.

(21) Appl. No.: 13/450,259

(22) Filed: Apr. 18, 2012

(65) Prior Publication Data

US 2013/0077329 A1    Mar. 28, 2013

(30) Foreign Application Priority Data

Sep. 26, 2011  (EP) ..................................... 11182744

(51) Int. Cl.
| | |
|---|---|
| B60Q 1/00 | (2006.01) |
| F21V 29/00 | (2006.01) |
| B60Q 1/06 | (2006.01) |
| B64D 47/06 | (2006.01) |
| B62D 47/02 | (2006.01) |
| F21V 29/02 | (2006.01) |

(52) U.S. Cl.
CPC ................ *B64D 47/06* (2013.01); *B62D 47/02* (2013.01); *F21V 29/02* (2013.01); *B64D 2203/00* (2013.01)

(58) Field of Classification Search
CPC .... B64D 47/02; B64D 47/06; B64D 2203/00; F21V 29/02
USPC ............ 362/470, 546, 547, 294, 373; 165/41, 165/42, 44, 59, 80.2, 80.3; 361/689–692, 361/702
See application file for complete search history.

(56) References Cited

U.S. PATENT DOCUMENTS

| | | | | |
|---|---|---|---|---|
| 4,642,997 | A * | 2/1987 | Krafka | .............................. 62/87 |
| 4,733,335 | A * | 3/1988 | Serizawa et al. | ............. 362/503 |
| 6,191,541 | B1 * | 2/2001 | Patel et al. | .................... 315/307 |
| 7,414,546 | B2 * | 8/2008 | Singer et al. | .................. 340/961 |
| 7,440,280 | B2 * | 10/2008 | Shuy | .............................. 361/701 |
| 7,828,465 | B2 | 11/2010 | Roberge et al. | |

(Continued)

FOREIGN PATENT DOCUMENTS

| | | |
|---|---|---|
| DE | 102006057553 | 6/2007 |
| DE | 20200002772 | 8/2010 |
| DE | 102009019226 | 11/2010 |
| GB | 575093 | 2/1946 |

(Continued)

OTHER PUBLICATIONS

Image of Boeing 747-458 taken by Amir Shapira, (http://www.airliners.net/photo/El-Al-Israel/Boeing-747-458/1612677/L/), Image published on Nov. 21, 2009.*

(Continued)

*Primary Examiner* — Robert May
*Assistant Examiner* — Alexander Garlen
(74) *Attorney, Agent, or Firm* — Cantor Colburn LLP

(57) ABSTRACT

An aircraft light comprises a housing (24), at least one light source (32) to be cooled, the at least one light source (32) being arranged in the housing (24), a heat sink element (26) thermally coupled to the at least one light source (32) and defining a cooling surface (36) exposable to a cooling airstream (52) for the cooling airstream (52) to flow along the cooling surface (36) in a flow direction. The cooling surface (36) extends between upstream and downstream end portions (40,42) spaced apart in the flow direction and means for generating a pressure difference between the upstream and downstream end portions (40,42) of the cooling surface. Due to the pressure difference, a cooling airstream (52) flowing along the cooling surface (36) is created.

18 Claims, 2 Drawing Sheets

(56) References Cited

U.S. PATENT DOCUMENTS

| | | |
|---|---|---|
| 2005/0111234 A1 | 5/2005 | Martin et al. |
| 2006/0262544 A1 | 11/2006 | Piepgras et al. |
| 2007/0070630 A1 | 3/2007 | Kittredge et al. |
| 2007/0164875 A1 | 7/2007 | Fredericks et al. |
| 2009/0073689 A1 | 3/2009 | Patrick |
| 2009/0154189 A1 | 6/2009 | Cho et al. |
| 2010/0177519 A1* | 7/2010 | Schlitz .......................... 362/294 |
| 2011/0141690 A1 | 6/2011 | Le et al. |

FOREIGN PATENT DOCUMENTS

| | | |
|---|---|---|
| WO | 03089841 | 10/2003 |
| WO | 2008137732 | 11/2008 |
| WO | 2010111223 | 9/2010 |

OTHER PUBLICATIONS

Extended European Search Report for Appliction No. 11182744.0-2422; Date of mailing Feb. 17, 2012.

\* cited by examiner

AIRCRAFT LIGHT

BACKGROUND OF THE INVENTION

Field of the Invention

The present invention relates to an aircraft light and, in particular, to an aircraft light being actively cooled by a cooling airstream which due to diverse physical effects is created by a gas stream which does not result merely from the flight motion of the aircraft.

BACKGROUND

External lights for aircrafts can be used e.g. as anti-collision lights, beacon lights or position lights. Other external aircraft lights include e.g. landing lights, taxi lights and runway turn-off lights. For years already, the use of LEDs as light sources for aircraft lights is known. In particular, high intensity LEDs are used with a plurality of these LEDs being arranged in an aircraft light. The operation of the LEDs results in heat energy losses which can degrade and in the worst case destroy the LEDs. Accordingly, the LEDs of aircraft lights are cooled.

In the prior art, diverse active and passive cooling concepts do exist. For example, according to US-A-2007/0164875, an LED aircraft anti-collision beacon light is cooled using the airstream flowing around the light when the aircraft is in flight. In other known lights, Venturi tubes are used so as to create a Venturi effect and, based on that, air movement. Examples of this type of cooling concept in lights are disclosed e.g. in US-A-2009/0073689, DE-A-10 2009 019 226, and DE-A-10 2006 057 553.

Finally, from U.S. Pat. No. 7,828,465 and WO-A-2008/137732, LED-based fixtures are known in which the LEDs are cooled by using a chimney effect. Other lights using the chimney effect for creating cooling air movement are disclosed in US-A-2007/0070630, US-A-2006/0262544, and US-A-2005/0111234.

SUMMARY

It is an object of the present invention to provide an aircraft light having an improved cooling concept. According to the invention, this object is achieved by means of an aircraft light comprising a housing, at least one light source to be cooled, the at least one light source being arranged in the housing, a heat sink element thermally coupled to the at least one light source and defining a cooling surface exposable to a cooling airstream for the cooling airstream to flow along the cooling surface in a flow direction, wherein the cooling surface extends between upstream and downstream end portions spaced apart in the flow direction, and means for generating a pressure difference between the upstream and downstream end portions of the cooling surface, wherein, due to the pressure difference, a cooling airstream flowing along the cooling surface is created.

The aircraft light according to the invention comprises a housing having at least one light source to be cooled and a heat sink element thermally coupled to the at least one light source. The heat sink element comprises at least one cooling surface area exposable to a cooling airstream so that the cooling airstream flows along the cooling surface in a flow direction. The cooling surface can be part of the outer surface of the housing or can be the surface of channel structures or the like extending through the housing. The channel structures can be formed completely by diverse portions of the housing or the heat sink element or by outer surface portions and outer structures of the housing in conjunction with portions of the outer side of the aircraft to which portions the aircraft light is mounted.

The cooling surface of the heat sink element of the aircraft light according to the invention generally extends between upstream and downstream end portions spaced apart in the flow direction. Accordingly, the cooling airstream first contacts the cooling surface in the area of the upstream end portion so as to flow along the cooling surface until it reaches the downstream end portion, and further towards the environment around the aircraft light housing.

The cooling airstream is created based on a pressure difference between the upstream and downstream end portions of the cooling surface, with a means being provided for generating said pressure difference.

According to the invention, no blower or the like is used in order to generate the pressure difference and, accordingly, creating the cooling airstream.

In one preferred embodiment of the present invention, the means for generating a pressure difference comprises a means for generating a gas jet stream creating a pressure drop at the downstream end portion of the cooling surface so that the pressure at the downstream end portion of the cooling surface is lower than the pressure at the upstream end portion of the cooling surface. In this embodiment, Venturi and Bernoulli effects are used so as to create cooling air movement and the cooling airstream.

According to a further aspect of the present invention, the gas jet stream comprises exhaust gas ejected along an ejecting direction through an exhaust gas outlet of a gas turbine of an auxiliary power unit of an aircraft, wherein the housing is positioned adjacent to the exhaust gas outlet, with the cooling airflow direction pointing substantially perpendicularly to the ejecting direction and with the upstream end portion of the cooling surface facing away from the exhaust gas outlet.

If the aircraft is equipped with an Auxiliary Power Unit (APU), the APU is typically mounted at the tail of the aircraft, wherein the exhaust gas outlet of the APU is close to the preferred location for mounting the tail navigation and anti-collision lights. This creates typically a considerable thermal load and additionally a deposition of exhaust gas. During normal flight, the APU is not in operation and sufficient cooling is available by means of airflow, but on the ground the APU exhaust gas temperatures and ambient temperatures add up, and create premature aging of the electronic components in the light unit. The fast gas stream in the APU outlet and beyond the actual outlet creates a local zone of low pressure according to the teachings of Bernoulli and Venturi. The kinetic and pressure potential of a mass stream always remain constant. For this reason, surrounding air is sucked into the fast moving airstream. The pressure differential is used to create the cooling airstream flowing along the cooling surface.

The housing is arranged so that the downstream end portion of the cooling surface is located beside, and close to, the exhaust gas outlet of the APU while the upstream end portion of the cooling surface is facing away from the exhaust gas outlet. Accordingly, due to the pressure differential, cold air is sucked from the area surrounding the housing at the upstream end portion of the cooling surface, flows along the cooling surface and exits the cooling surface at its downstream end portion. The structure of the cooling surface can be designed so as to optimize the flow of cooling air.

In a further embodiment of the present invention, the heat sink element comprises projecting cooling fins the surfaces of which form a portion of the cooling surface, wherein the fins substantially extend parallel to the cooling airflow direction. The fins increase the cooling surface area exposed to the cooling air. Also the fins support a certain airflow guiding effect.

Such a airflow guiding effect can also be achieved by lateral cooling airflow guiding projections extending between the upstream and downstream end portions of the cooling surface and substantially parallel to the airflow direction.

Typically, besides the at least one light source which typically is an LED, also further electrical and/or electronic components can be cooled according to the cooling concept of the present invention. Therefore, those additional components should also be thermally coupled to the heat sink element of the aircraft light.

In another embodiment of the present invention, the cooling surface comprises a structure for creating turbulences in areas of the cooling airstream closest to the cooling surface.

In a further aspect of the present invention, at least one of an electric and electronic component is to be cooled, wherein the component is thermally coupled to the heat sink element.

Any kind of fast gas stream in an aircraft like, e.g., the exhaust gas stream of an APU or the airstream created when the aircraft is flying, can be used to create a zone of relative low pressure and beneficially to cool an electronic device. The aircraft light should be located as close as possible to the gas stream, meaning that the aircraft light should be located at a distance from the gas stream which is smaller than the diameter of the gas stream and cover at least 10% of the width of the gas stream and block at least e.g. 5% of the diameter in depth of the gas stream, in order to be located close enough to be in an area of high pressure differential and to block-off an area sufficient in size to route the sucked-in air through the cooling air channel of the aircraft light instead of just around it. After having been used for cooling, the internal airstream can be further used to shield the device against dirty gas by creating a protective air-layer of clean air over the lens cover or housing. A directional change of the air through the light is useful to ensure maximum energy transmission from the unit to the cooling air.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which.

DESCRIPTION OF A PREFERRED EMBODIMENT

Figure 1:
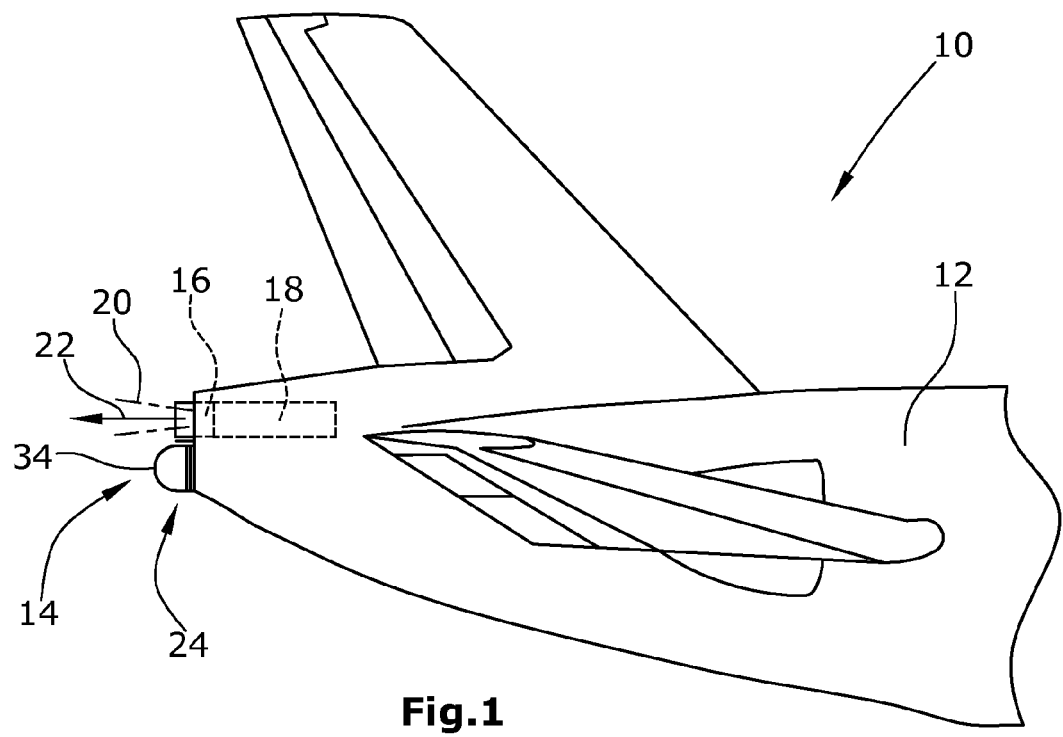
FIG. 1 is a side view to the tail portion of an aircraft provided with a tail light (both strobe and position light, if desired) and an APU.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows the tail portion 10 of an aircraft 12 having a tail light 14 which e.g. can be a combination of both a strobe and a position light. The tail light 14 is located in close vicinity to the exhaust gas outlet 16 of an APU 18 ejecting a fast and hot exhaust gas jet stream 20 through the exhaust gas outlet 16 in an ejecting direction 22.

Figure 2:
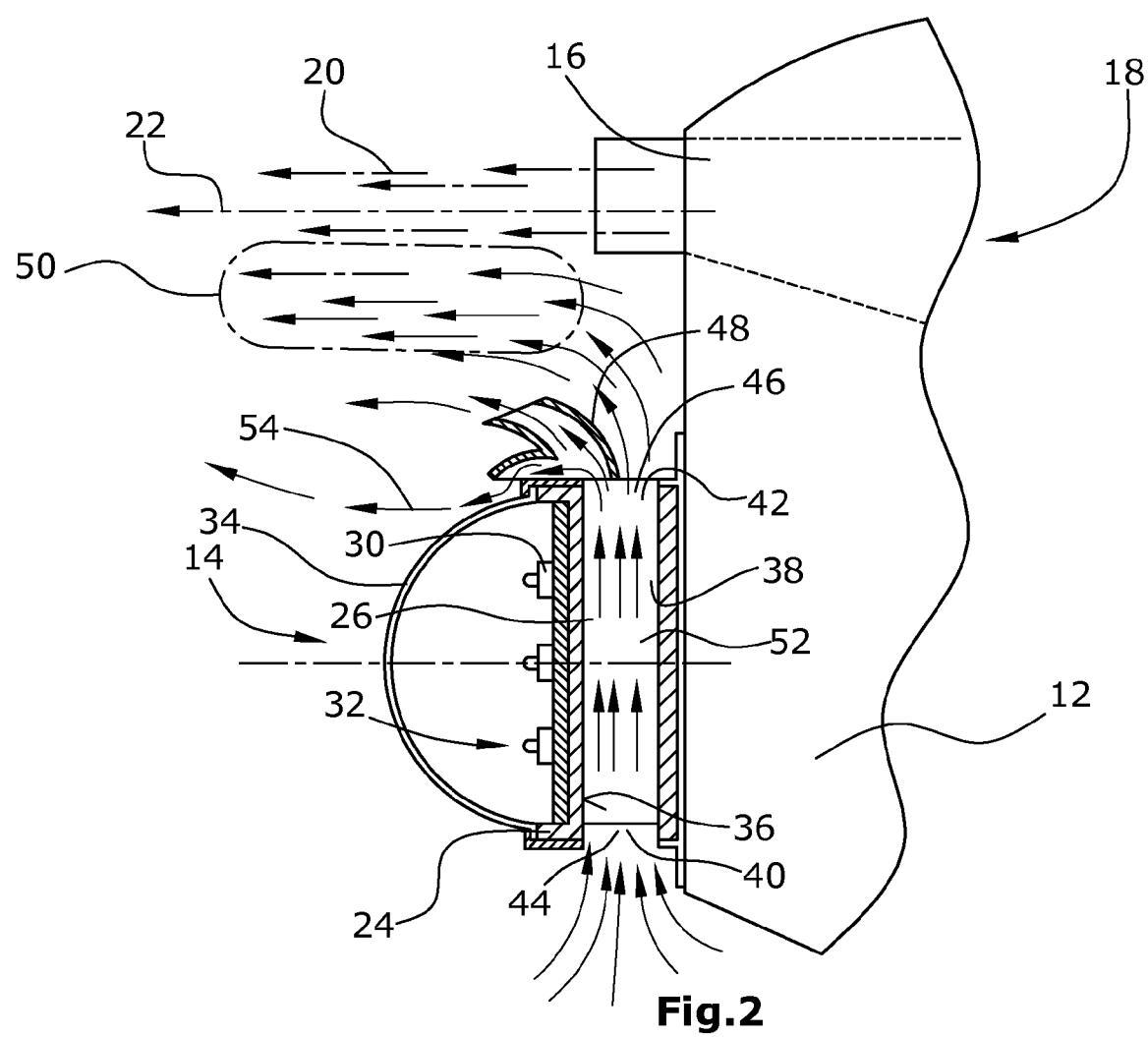
FIG. 2 is a view similar to FIG. 1 but on a larger scale to show certain details of the embodiment of the aircraft tail light.

As shown in cross-section in FIG. 2, the tail light 14 comprises a housing 24 at least partially built by a heat sink element 26. A printed circuit board 28 or another type of support element is thermally coupled to the heat sink element 26 and located within the housing 24. The printed circuit board 28 or support element carries a plurality of LEDs 30 which form light sources 32 of the tail light 14. Also other electronic or electric elements or components can be arranged on the printed circuit board 28 or support element. A cover lens 34 is used for closing the housing 24. The cover lens is transparent and may or may not be provided with optic elements for influencing the light distribution of the light emitted by the tail light 14.

As also shown in FIG. 2, the heat sink element 26 is provided with cooling surfaces 36 which are exposed to an airstream. In this embodiment, the heat sink element 26 is provided with projecting fins 38 forming channel walls and channels through which cooling air can pass as explained hereinbelow. The projecting fins 38 extend substantially parallel to each other and in a direction substantially perpendicular to the ejecting direction 22 of the exhaust gas jet stream 20.

The cooling surfaces extend between an upstream end portion 40 and a downstream end portion 42 which define a cooling air inlet 44 and a cooling air outlet 46, respectively, as shown in FIG. 2. The cooling air outlet 46 is located close to the exhaust gas outlet 16 of the APU 18 while the cooling air inlet 44 is located facing away from the exhaust gas outlet 16. Between the exhaust gas outlet 16 and the cooling air outlet 46 of the housing 24, there are arranged airstream guiding elements 48,49 which, however, can also be omitted.

Due to the Venturi and Bernoulli effects, the high speed exhaust gas jet stream 20 in its vicinity creates an area 50 of low pressure resulting in a sucking-in effect of air along the cooling surfaces 36. Namely, the low pressure in the area 50 due to its fluid communication to the cooling air inlet 44 creates also low pressure at the cooling air inlet 44. Accordingly, a cooling airstream 52 is created which flows along the cooling surfaces 36. This cooling airstream 52 exits through the cooling air outlet 46 and flows outside of the housing 24 through the airstream guiding elements 48,49. The cooling airstream 52 can further be used to flow over the cover lens 34 of the tail light 14, creating a layer of relatively clean air 54 so as to prevent the exhaust gas of the APU 18 from directly contacting the cover lens 34 so that the cover lens 34 stays relatively clean and will not get too dirty from the exhaust gas.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. In particular, also using the cooling airstream 52 for protecting the cover lens 34 from becoming dirty from the exhaust gas of the APU 18 is not necessary according to the scope of the invention. Also the cooling air gas stream can flow along the cooling surfaces 36 in different directions, meaning that the cooling fins 38, if provided, can be shaped differently and extend in different directions, too. Also the cross-section of the cooling channels which may or may not be provided according to the present invention can be basically arbitrary. In particular, it is not necessary for the invention that the channels due to their construction create any aerodynamic effects by themselves. Accordingly, the cooling air channels need not to be designed as Venturi tubes or tubes supporting a chimney effect or the like. Therefore, in the invention, no intrinsic air movement effects within the cooling air channels are necessary because it is the generation of the pressure difference which results in the cooling air movement along the cooling surfaces. The core of the invention has to be seen in an arrangement allowing an area of a fast gas or airflow to be used for creating a zone of relatively low pressure. This area 50 of low pressure creates a suction effect on relatively cold air from a further area or zone spaced apart from the fast air or gas flow, wherein the temperature of the air in this further area or zone is not affected by the temperature of the fast air or gas flow. It is therefore intended to include within the invention all such variations and modifications as fall within the scope of the appended claims and equivalents thereof.

LIST OF REFERENCES

10 tail portion of aircraft
12 aircraft
14 tail light
16 exhaust gas outlet
18 auxiliary power unit (APU)
20 exhaust gas jet stream
22 ejecting direction of exhaust gas
24 housing
26 heat sink element
28 circuit board
30 LED
32 light source
34 cover lens
36 cooling surface
38 cooling fins of cooling surface
40 upstream end portion of cooling surface
42 downstream end portion of cooling surface
44 cooling air inlet
46 cooling air outlet
48 airstream guiding element
49 airstream guiding element
50 area of low pressure
52 cooling airstream
54 air layer over cover lens

What is claimed is:

1. An aircraft comprising:
an auxiliary power unit (APU), mounted at the tail of the aircraft and having an exhaust gas outlet for ejecting a gas jet stream; and
an aircraft light, positioned in close vicinity adjacent to the exhaust gas outlet of the APU at the tail of the aircraft, the aircraft light comprising
a housing coupled to a heat sink element;
at least one light source to be cooled, the at least one light source being arranged in the housing; and
the heat sink element thermally coupled to the at least one light source, an interior of the heat sink element defining a cooling channel traversing the interior between an upstream and a downstream end portion of the cooling channel, the cooling channel includes a cooling surface that extends between the upstream and the downstream end portions being spaced apart in a flow direction from the upstream end portion to the downstream end portion, the cooling channel being exposed to a cooling airstream for the cooling airstream to flow along the cooling surface in the flow direction,
wherein the gas jet stream of the APU is provided adjacent to the downstream end portion, the gas jet stream being configured to create a pressure difference between the upstream and the downstream end portions,
wherein the cooling air channel has a cooling air inlet facing toward ground, with a vertical, upward cooling air intake via the cooling air inlet being unobstructed by aircraft elements, and
an airstream guiding element coupled to the housing and located immediately adjacent to the downstream end portion and guiding only a part of the cooling airstream along an exterior of the housing, the part of the cooling airstream generating a shielding air layer protecting the exterior of the housing from being exposed to the atmosphere around the housing.

2. The aircraft according to claim 1, wherein the gas jet stream creates a pressure drop at the downstream end portion so that the pressure at the downstream end portion is lower than pressure at the upstream end portion, the pressure drop being operable to suck the cooling airstream through the of the cooling channel from the upstream end to the downstream end.

3. The aircraft according to claim 2, wherein the gas jet stream comprises exhaust gas ejected along an ejecting direction through an exhaust gas outlet of a gas turbine of an auxiliary power unit of an aircraft, and wherein the housing is positioned adjacent to the exhaust gas outlet with the cooling airflow direction pointing substantially perpendicularly to the ejecting direction and with the upstream end portion of the cooling surface facing away from the exhaust gas outlet.

4. The aircraft according to claim 1, wherein the heat sink element comprises projecting cooling fins the surfaces of which form a portion of the cooling surface.

5. The aircraft according to claim 1, further comprising lateral cooling airflow guiding projections extending between the upstream and downstream end portions of the cooling surface.

6. The aircraft according to claim 1, wherein the cooling surface comprises a structure for creating turbulences in areas of the cooling airstream closest to the cooling surface.

7. The aircraft according to claim 1, wherein the at least one light source is an LED.

8. The aircraft according to claim 1, further comprising at least one of an electric and electronic component to be cooled, wherein the component is thermally coupled to the heat sink element.

9. The aircraft light according to claim 1, wherein the airstream guiding Element is located outside of the housing.

10. An aircraft light cooling assembly comprising:
an auxiliary power unit (APU), mounted at the tail of the aircraft and having an exhaust gas outlet for ejecting a gas jet stream; and
an aircraft light assembly, positioned in close vicinity adjacent to the exhaust gas outlet of the APU at the tail of the aircraft, the aircraft light assembly comprising
a housing including a cover lens connected to a heat sink element;
at least one light source to be cooled, the at least one light source being arranged in the housing; and
the heat sink element thermally coupled to the at least one light source, an interior of the heat sink element defining a cooling channel traversing the interior between an upstream and a downstream end portion of the cooling channel, the cooling channel defining a cooling surface exposed to a cooling airstream for the cooling airstream to flow along the cooling surface in a flow direction through the cooling channel, wherein the cooling surface extends between the upstream and downstream end portions spaced apart in the flow direction;

wherein the gas jet stream of the APU is provided adjacent to the downstream end portion, the gas jet stream being configured to create a pressure difference between the upstream and the downstream end portions of the cooling surface and create the cooling airstream, and wherein the cooling air channel has a cooling air inlet facing toward ground, with a vertical, upward cooling air intake via the cooling air inlet being unobstructed by aircraft elements, and an airstream guiding element located downstream of the cooling surface and guiding only a part of the cooling airstream along the housing and generating a shielding air layer protecting the cover lens being exposed to the atmosphere around the housing.

11. The aircraft light cooling assembly of claim 10, further comprising:

a gas turbine engine configured to create the gas jet stream in a direction that is substantially perpendicular to the cooling airstream flow.

12. The aircraft light cooling assembly of claim 10, further comprising:

an airstream that is configured to create the gas jet stream in a direction that is substantially perpendicular to the cooling airstream flow.

13. The aircraft light cooling assembly according to claim 10, wherein the heat sink element comprises projecting cooling fins the surfaces of which form a portion of the cooling surface.

14. The aircraft light cooling assembly according to claim 10, further comprising lateral cooling airflow guiding projections extending between the upstream and downstream end portions of the cooling surface.

15. The aircraft light cooling assembly according to claim 10, wherein the cooling surface comprises a structure for creating turbulences in areas of the cooling airstream closest to the cooling surface.

16. The aircraft light cooling assembly according to claim 10, wherein the at least one light source is an LED.

17. The aircraft light cooling assembly according to claim 10, further comprising at least one of an electric and electronic component to be cooled, wherein the component is thermally coupled to the heat sink element.

18. The aircraft light cooling assembly according to claim 11, wherein the airstream guiding element is coupled to the housing and located immediately adjacent to the downstream end portion.

* * * * *